(12) United States Patent
Sutter

(10) Patent No.: US 7,261,853 B2
(45) Date of Patent: Aug. 28, 2007

(54) DECELERATED EJECTOR PIN SYSTEM AND METHOD FOR OPERATING THE SAME

(75) Inventor: Kevin Sutter, Kettering, OH (US)

(73) Assignee: Eagle Mold Company, Carlisle, OH (US)

( * ) Notice: Subject to any disclaimer, the term of this patent is extended or adjusted under 35 U.S.C. 154(b) by 269 days.

(21) Appl. No.: 10/893,663

(22) Filed: Jul. 16, 2004

(65) Prior Publication Data

US 2006/0012078 A1   Jan. 19, 2006

(51) Int. Cl.
*B29C 45/44* (2006.01)

(52) U.S. Cl. .................. 264/318; 249/68; 264/334; 425/444; 425/556

(58) Field of Classification Search ............... 264/318, 264/334, 336; 425/556, 438, 444; 249/67, 249/68
See application file for complete search history.

(56) References Cited

U.S. PATENT DOCUMENTS

| | | | |
|---|---|---|---|
| 2,304,899 A * | 12/1942 | Dupre | 249/67 |
| 3,137,905 A | 6/1964 | Steinman et al. | |
| 3,334,378 A * | 8/1967 | Scherrer-Wirz et al. | 425/444 |
| 3,687,591 A | 8/1972 | Perego | |
| 3,893,644 A * | 7/1975 | Drazick | 249/68 |
| 4,050,666 A | 9/1977 | Van Tichelt | |
| 4,854,849 A * | 8/1989 | Sudo | 425/556 |
| 5,227,178 A * | 7/1993 | Rieker | 425/556 |
| 5,281,127 A | 1/1994 | Ramsey | |
| 5,372,773 A | 12/1994 | Sorensen et al. | |
| 5,439,371 A * | 8/1995 | Sawaya | 425/553 |
| 5,895,621 A | 4/1999 | Tajiri et al. | |
| 6,491,513 B1 | 12/2002 | Schneider | |
| 6,638,467 B1 * | 10/2003 | Yamamoto | 264/263 |
| 2002/0076466 A1 | 6/2002 | Mowery et al. | |

FOREIGN PATENT DOCUMENTS

| | | | |
|---|---|---|---|
| JP | 60-99619 | * | 6/1985 |
| JP | 62-130817 | * | 6/1987 |
| JP | 3-246-020 | * | 11/1991 |
| JP | 5-200806 | * | 8/1993 |

OTHER PUBLICATIONS

Menges et al., How to Make Injection Molds, 3rd edition, 2001, Hanser Publishers, pp. 437-474.*
"Acelerador Expulsion/Accelerated Ejector", CUMSA General Catalogue, Feb. 2004, p. 2.13.

* cited by examiner

*Primary Examiner*—Jill L. Heitbrink
(74) *Attorney, Agent, or Firm*—Laurence A. Greenberg; Werner H. Stemer; Alfred K. Dassler

(57) ABSTRACT

A decelerated ejector pin system in an ejector half of an injection mold, that molds a molded part. The ejector half has at least one lifter, a core plate, a pin plate, an ejector bar, a base plate, and at least one ejector pin. The decelerated ejector pin system includes at least one further ejector pin to be moved and decelerated through the core plate. The decelerated ejector pin system has at least one sleeve that is actuated by the core plate for decelerating the further ejector pin. A spring is disposed in the ejector bar. At least one stop pin supports the further ejector pin and compresses the spring, and a cap attaches to the stop pin for pre-stressing the spring.

8 Claims, 11 Drawing Sheets

DECELERATED EJECTOR PIN SYSTEM AND METHOD FOR OPERATING THE SAME

BACKGROUND OF THE INVENTION

1. Field of the Invention

The invention relates to an apparatus for de-molding injection molded parts, more specifically, to an injection mold which requires lifters to de-mold the part, has a part cavity that is shallower than the lifter cavity detail depth, requires a controlled ejection due to the part geometry (i.e.: part texture or cavity depth), or has limited space in the ejection system. The invention also relates to a method for ejecting a part having an embedded ejector pin.

2. Description of the Related Art

It is prior-art practice, for example, in the case of injection molds, which use lifters to create desired part features, to use embedded ejector pins to hold a molded part stationary in the lifter de-molding axis. The embedded ejector pin allows the molded part to separate from the lifter. This practice has the disadvantage that the molded part is stuck to the embedded pin at the end of the ejection cycle. A molded part that is not ejected is very disadvantageous because it can lead to a disruption of the cycle, defective part(s) when the injection mold closes on the non-ejected part, and thus a lower productivity.

In order to deal with this problem several solutions have been proposed in the prior art. One solution is to use an air blow-off to blow the part off of the embedded ejector pin. This solution has the disadvantages that there is no control of the part when it is blown off and that air blow-offs generate dirt in the injection mold. Another solution is the use of a robot to remove the parts. This solution has the disadvantages of a large capital expense, longer cycle times, and additional maintenance costs. A third solution is to have an operator manually remove the parts. This solution has the disadvantages of inconsistent cycle times, longer cycle times, and additional labor costs.

Accordingly, prior art ejector systems have the disadvantages that they do not provide a satisfactory solution for removing an embedded ejector pin from a molded part.

SUMMARY OF THE INVENTION

It is accordingly an object of the invention to provide an ejector system and a method for ejecting a part having an embedded ejector pin which overcome the above-mentioned disadvantages of the heretofore-known devices and methods of this general type and which provides an ejector system for a mold requiring embedded ejector pins that is easily manufactured, easy to maintain, is durable, and reliable.

With the foregoing and other objects in view there is provided, in accordance with the invention in an ejector half of an injection mold, for molding a molded part. The ejector half has at least one lifter, a core plate, a pin plate, an ejector bar, a base plate, and at least one ejector pin. A decelerated ejector pin system includes at least one further ejector pin to be moved and decelerated through the core plate. At least one sleeve is actuated by the core plate for decelerating the further ejector pin. A spring is disposed in the ejector bar and at least one stop pin supports the further ejector pin and compresses the spring. A cap is attached to the stop pin for pre-stressing the spring.

In accordance with another feature of the invention, the further ejector pin has a head and a shaft. The sleeve has a head and is located on the shaft of the further ejector pin and a counter bore formed in the core plate actuates the sleeve by engaging the sleeve head.

In accordance with a further feature of the invention, the stop pin has a head and a shaft, the shaft of the stop pin is disposed inside the spring, and the head of the further ejector pin rests on the head of the stop pin for compressing the spring.

In accordance with an added feature of the invention, a screw attaches the cap to the stop pin.

In accordance with an additional feature of the invention the further ejector pin is longer than the at least one ejector pin.

With the objects of the invention in view, there is also provided in an injection mold having an ejector half for molding a molded part in an injection molding machine with ejector drive system. The ejector half, includes a core plate that has a cavity formed therein. A retainer plate is disposed adjacent the core plate. An ejector bar is disposed adjacent the retainer plate. A base plate is disposed adjacent the ejector bar. At least one ejection pin is mounted in the retainer plate and is moveable through the core plate. At least one lifter has a cavity detail forming a feature in the molded part and the lifter is moveable through the core plate. At least one further ejector pin is to be moved and decelerated through the core plate and projects into the cavity. At least one sleeve is actuated by the core plate for decelerating the further ejector pin. A spring is disposed in the ejector bar. At least one stop pin supports the further ejector pin and the stop pin is located inside the spring and compresses the spring. A cap is attached to the stop pin for pre-stressing the spring.

In accordance with yet another feature of the invention, the further ejector pin is longer than the at least one ejector pin.

In accordance with yet a further feature of the invention, the ejector pin and the further ejector pin are moveable through the core plate on an ejection axis.

In accordance with yet an added feature of the invention, the lifter is moveable through the core plate on an axis at an angle with respect to the ejection axis.

In accordance with yet an additional feature of the invention, the further ejector pin has a head and a shaft. The core plate has a counter bore formed therein. The sleeve has a head and is located on the shaft of the further ejector pin. The counter bore actuates the sleeve by engaging the sleeve head.

In accordance with still another feature of the invention, the stop pin has a head and a shaft. The shaft of the stop pin is disposed inside the spring. The head of the further ejector pin rests on the head of the stop pin and compresses the spring.

In accordance with still a further feature of the invention, a screw attaches the cap to the stop pin.

With the objects of the invention in view, there is also provided in an injection mold having an ejector half for molding a molded part in an injection molding machine with ejector drive system. The ejector half includes a core plate having a cavity formed therein. A retainer plate disposed adjacent the core plate. An ejector bar is disposed adjacent the retainer plate. A base plate disposed adjacent the ejector bar. At least one ejection pin is mounted in the retainer plate and is moveable through the core plate. At least one further ejector pin is to be moved and decelerated through the core plate and projects into the cavity. At least one sleeve is actuated by the core plate for decelerating the further ejector pin. A spring is disposed in the ejector bar. At least one stop pin supports the further ejector pin and compresses the spring. A cap is attached to the stop pin for pre-stressing the spring.

With the objects of the invention in view, there is also provided, a method of producing molded parts in an injection molding press during a cycle. The method includes providing an injection mold with an ejector half as described above. Clamping the injection mold and injecting material into the at least one cavity. Timing out a cooling stage of the cycle. Unclamping and opening the injection mold. Moving the ejector bar for ejecting the molded part from the injection mold. Decelerating the further ejector pin after the lifter cavity detail is de-molded from the molded part and de-molding the molded part from the further ejector pin.

In accordance with another mode of the invention, the material injected into the at least one cavity forms a part around the lifter cavity detail and the at least one further ejector pin.

In accordance with a further mode of the invention, a continuing movement of the ejector pins completely de-molds the at least one further ejector pin from the molded part and allows the molded part to be dropped clear of the injection mold.

With the objects of the invention in view, there is also provided, a method for ejecting a part from an injection mold having at least one embedded ejector pin. The method includes moving a plurality of ejector pins and the at least one embedded ejector pin through a core plate, and decelerating the at least one embedded ejector pin.

The prior art does not disclose a method for ejecting a part from an injection mold that has an embedded ejector, where one of the ejector pins is decelerated.

With the objects of the invention in view, there is also provided, a method for ejecting a part from an injection mold having at least one lifter with a cavity detail. The method includes embedding at least one ejector pin in the part, moving a plurality of other ejector pins and the at least one ejector pin through a core plate, and decelerating the at least one ejector pin.

The prior art does not disclose a method for ejecting a part from an injection mold that has a lifter with a cavity detail, where an embedded ejector pin is decelerated.

With the objects of the invention in view, there is also provided, a method for producing molded plastic parts in an injection molding machine during a cycle. The method includes providing an injection mold with an ejector half, a core plate, at least one cavity formed in the core plate, at least one lifter with a cavity lifter detail, ejector pins, and at least one further ejector pin projecting into the at least one cavity. Clamping the injection mold together and injecting material into the at least one cavity. Timing out a cooling stage of the cycle. Unclamping and opening the injection mold. Moving the ejector pins, the lifter, and the further ejector pin out of the core plate. The further ejector pin remains embedded in the part. Initiating a stopping of the further ejector pin, while the ejector pins continue to de-mold the part from the decelerated ejector pin. Further moving the ejectors for completely de-molding the further ejector pin from the molded part and allowing the molded part to be dropped clear of the injection mold.

In accordance with an additional mode of the invention, the further ejector pin holds the part and allows the lifter cavity detail to move along a lifter de-molding axis, while retracting from the molded part.

Other features which are considered as characteristic for the invention are set forth in the appended claims.

Although the invention is illustrated and described herein as embodied in a decelerated ejector pin system and a method of using the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
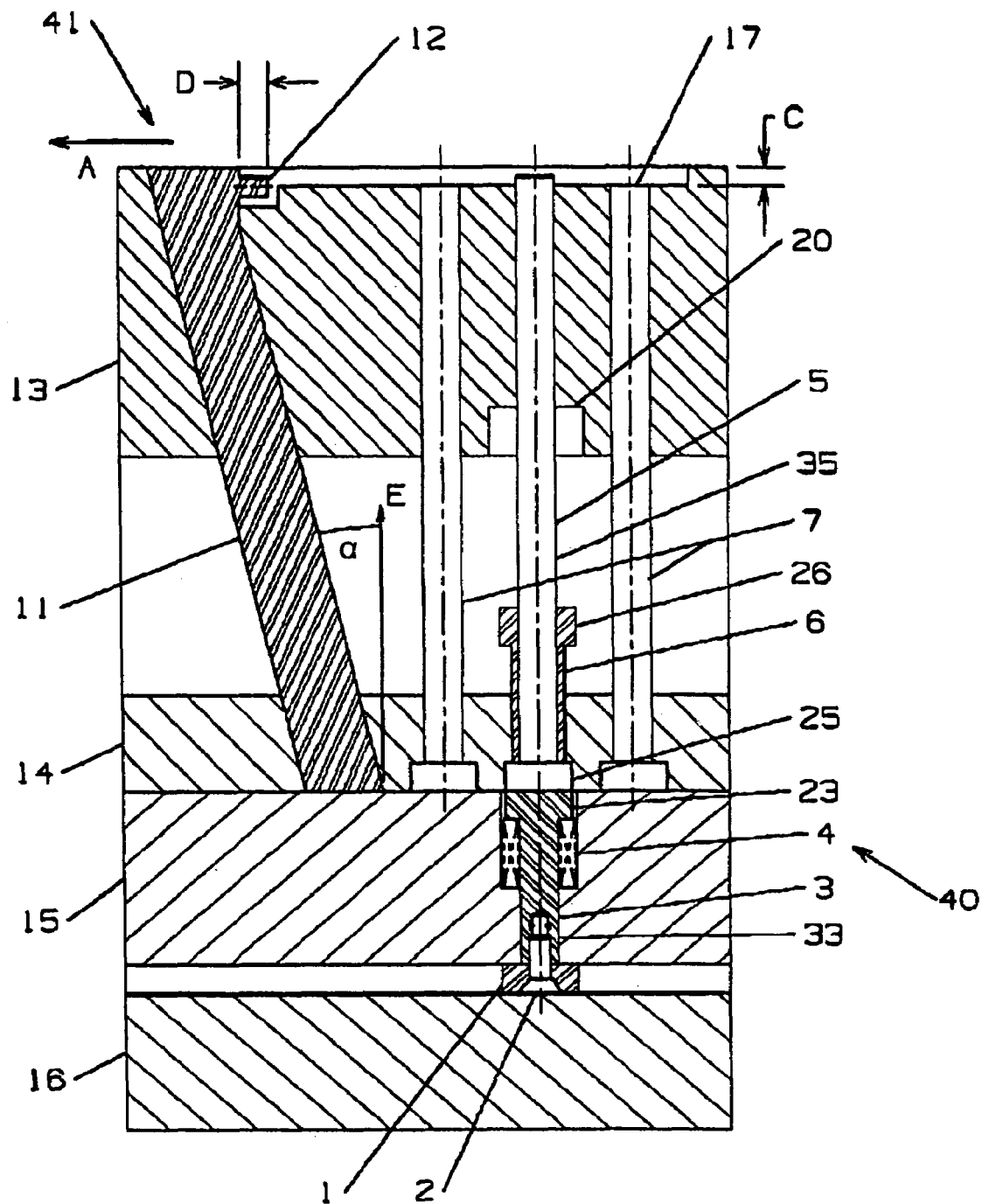
FIG. 1 is a diagrammatic, partial-sectional view of the ejector half of an injection mold according to the invention in a clamped state prior to plastic injection phase, including basic components of the ejector half of the mold.

Referring now to the figures of the drawing in detail and first, particularly, to FIG. 1 thereof, there is seen part of an ejector half 41 of an injection mold 45 (FIG. 11) according to the invention. The injection mold 45 can be used in any common injection-molding press (not illustrated) that properly corresponds to the size of the mold.

The ejector half 41 of the mold 45 includes a core plate or B-plate 13, an ejector system 40, and a bottom clamp plate or base plate 16. The core plate 13 includes a molding cavity 17, which has a depth C.

Figure 2:
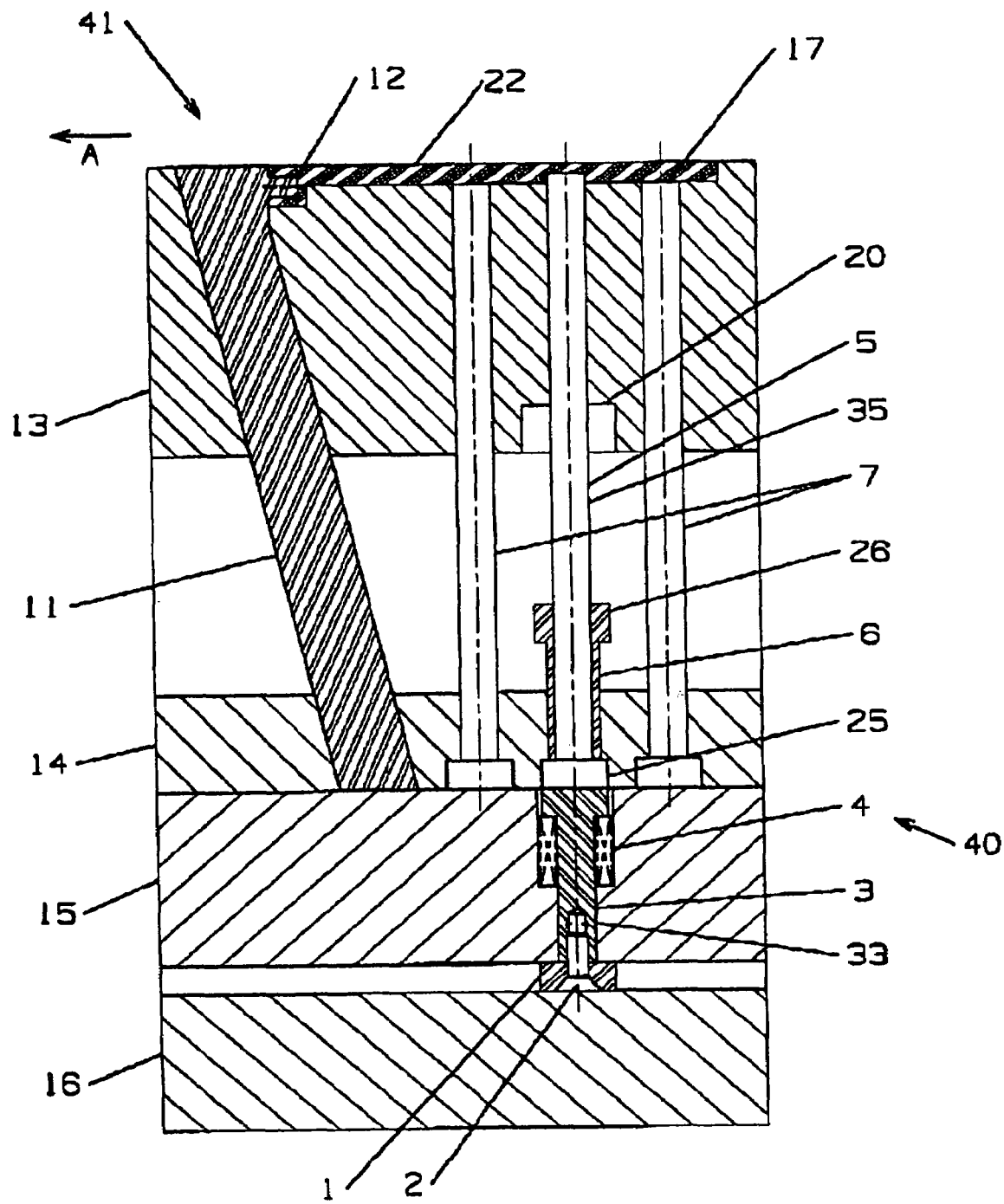
FIG. 2 is a partial-sectional view of the ejector half of the mold according to FIG. 1 after injection of plastic during a cooling phase.
Figure 8:
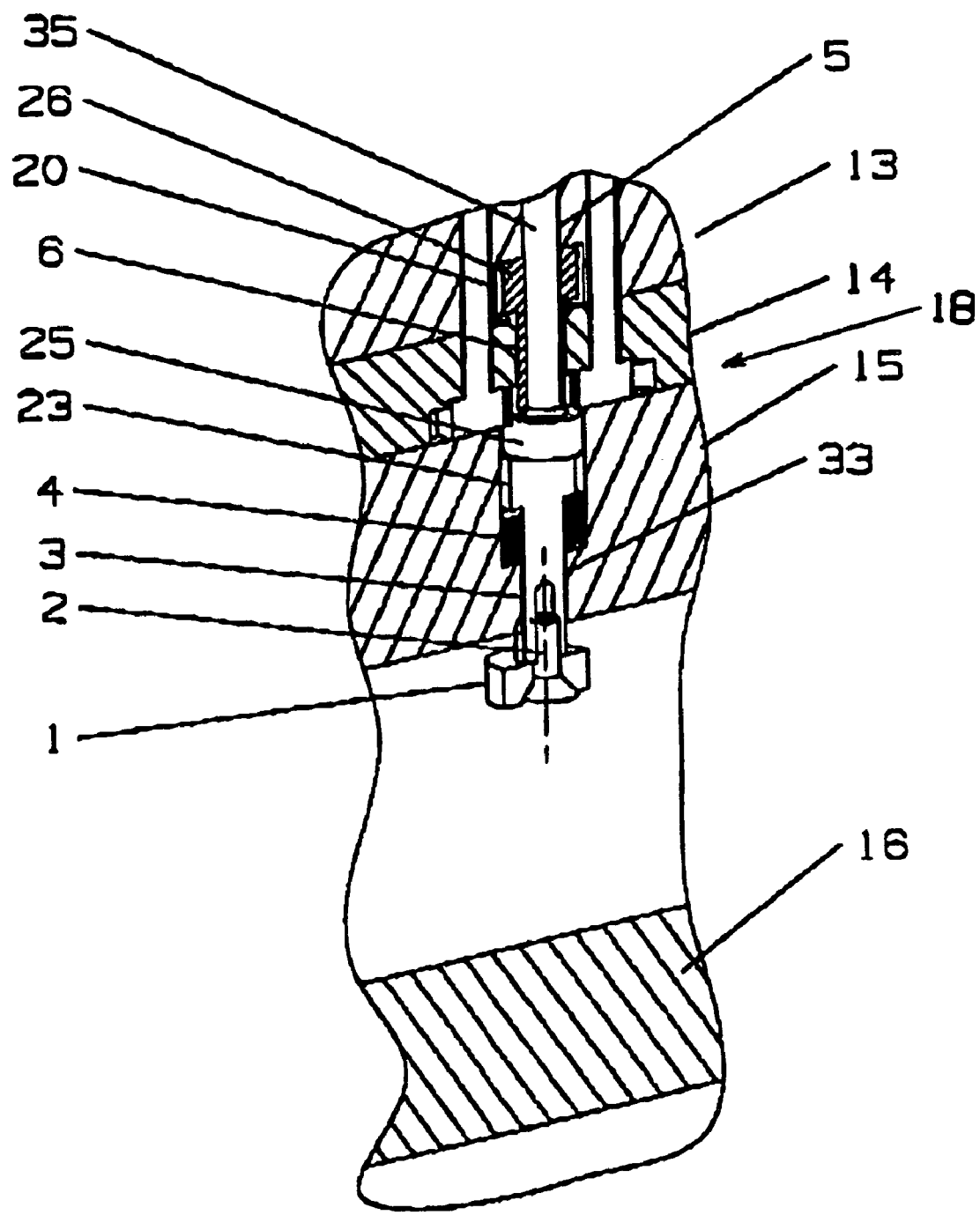
FIG. 8 is an enlarged sectional view of the decelerated ejector pin according to FIG. 1 during the third stage of ejection, as shown in FIG. 7, where the molded part is completely de-molded from the decelerated ejector pin.
Figure 10:
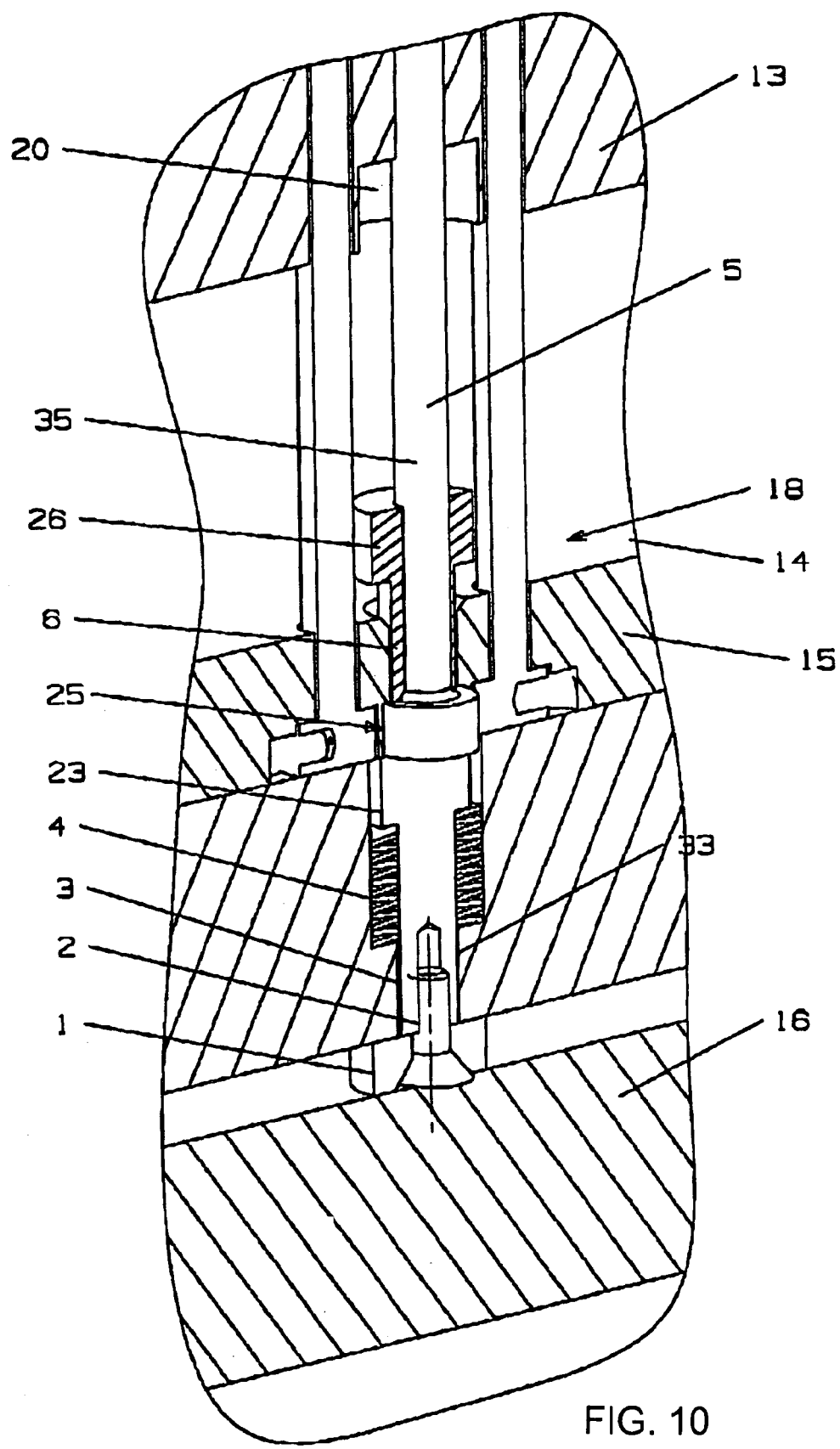
FIG. 10 is an enlarged sectional view of the decelerated ejector pin system according to FIG. 1 during the injection stage of the cycle, where the part is ready to be molded.

The ejector system 40, is a mechanical assembly that is free to move relative to the ejector half 41 of the mold 45 and is actuated by the injection-molding press to de-mold at least one molded part 22 (FIG. 2). The ejector system 40 includes a pin plate or retainer plate 14, an ejector bar 15, at least one lifter 11, ejector pins 7, and at least one decelerated ejector pin system 18 (FIGS. 8 and 10). The term "decelerated" is used to indicated that when the "decelerated" ejector pin system 18 is initiated, a "decelerated" ejector pin 5 is mechanically stopped while the rest of the ejection assembly continues to move to complete the de-molding process.

The lifter 11, a decelerated ejector pin or further ejector pin 5, and the ejector pins 7 are mounted in the pin plate 14 and are actuated along an ejection axis E by the ejector bar 15, which is actuated by an ejector system of the injection molding press, to eject the molded part 22. The decelerated ejector pin 5, and the ejector pins 7 slide through the core plate 13, along the ejection axis E to eject the molded part 22. The lifter 11 moves through the core plate at an angle α to the ejection axis E. The lifter 11 includes a cavity detail 12 that is molded into the molded part 22. The cavity detail 12 has a depth D, which is the depth that the cavity detail 12 creates in the molded part 22. As the press opens the mold and the lifter 11 moves out of the core plate 13, the cavity detail 12 de-molds from the molded part 22 along a lifter de-molding axis A.

The decelerated ejector pin system 18 includes a decelerated ejector pin 5 with a head 25 and a shaft 35. The decelerated pin 5 projects into the cavity 17 and is embedded into the molded part 22 to prevent the molded part 22 from moving along the lifter de-molding axis A. A sleeve 6 is provided on the ejector pin shaft 35 at the pin plate 14. The sleeve 6 has a head 26. A stop pin 3 is provided that has a head 23 and a shaft 33. The decelerated ejector pin 5 is located on the head 23 of the stop pin 3. The head 23 abuts a spring 4 that is located in the ejector bar 15 and held in place between the ejector bar 15 and the head 23 to pre-stress the stop pin 3. The shaft 33 of the stop pin 3 is located inside the spring 4. The stop pin 3 and the spring 4 are retained in the ejector bar 15 by a cap 1 and screw 2.

Figure 5:
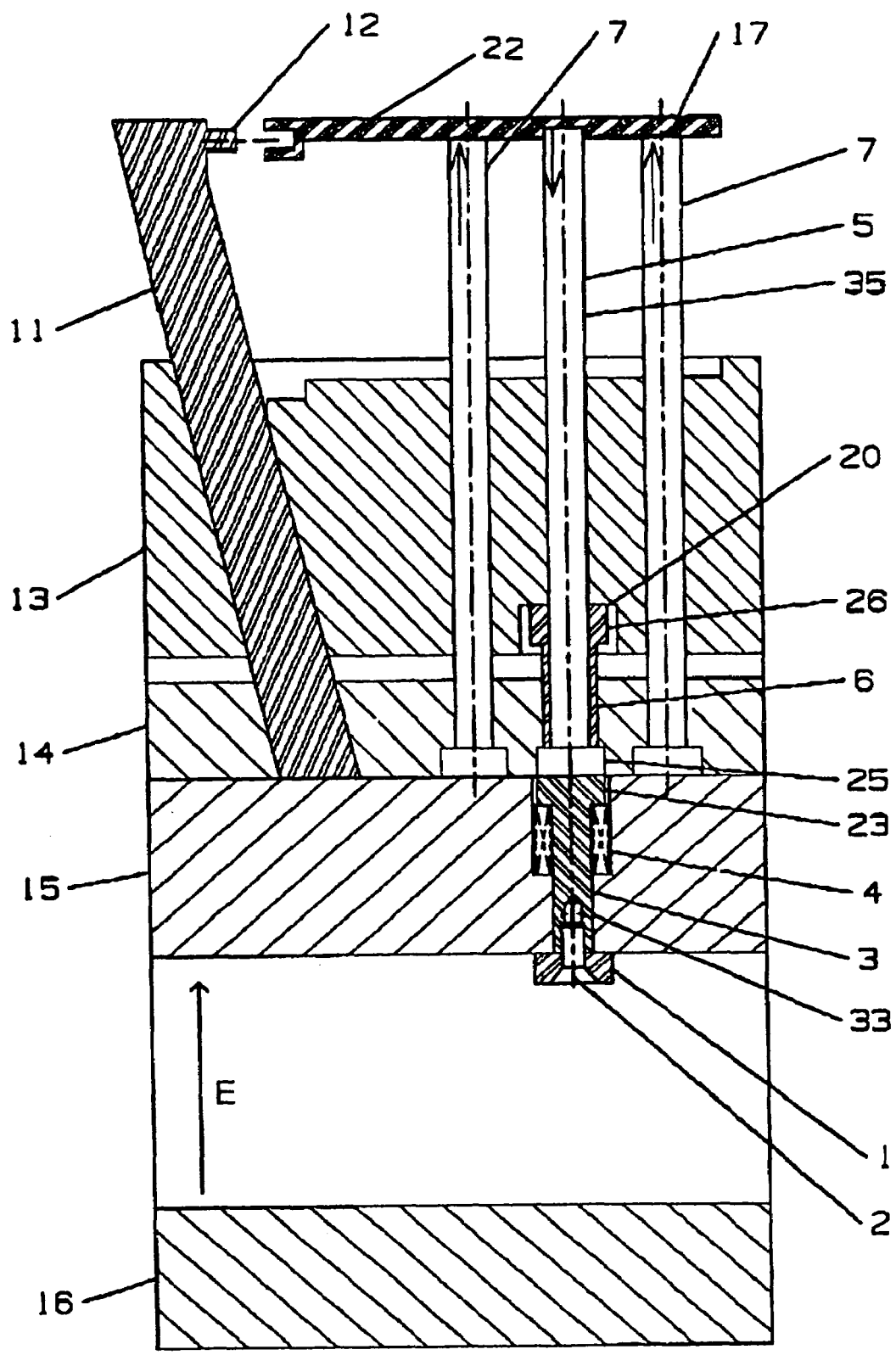
FIG. 5 is a partial sectional view of the ejector half of the mold according to FIG. 1 during a second stage of ejection, where the lifter cavity detail is completely de-molded and the decelerated ejector pin is initially decelerated.

As can be seen in FIG. 5 the sleeve 6 mechanically stops the decelerated ejector pin 5 by making contact with a counter bore 20 provided in the core plate 13. Alternatively, it is possible to eliminate the counter bore 20 if stroke limiters (not illustrated) are used in the mold 45. The stroke limiters are required when the stroke needed to eject the part is less than the ejection stroke available. If stroke limiters are used to positively stop the pin plate 14 and the ejector bar 15 before they reach the core plate 13 the counter bore 20 can be eliminated.

The operation of the device during a molding cycle will be described with respect to the drawings and the above-provided description.

Figure 11:
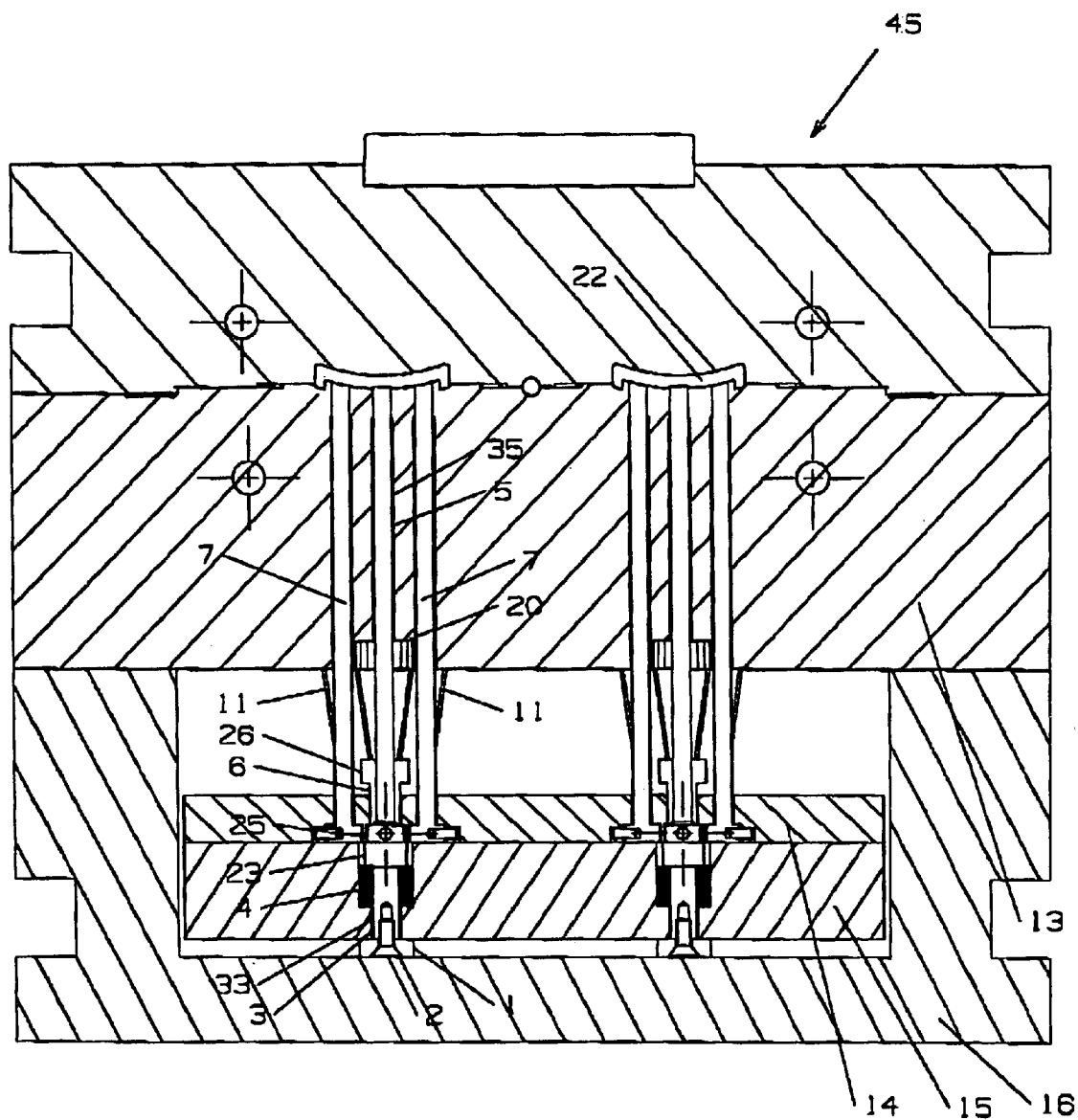
FIG. 11 is a sectional view of both halves of an injection mold showing the decelerated ejector pin system according to FIG. 1 during the injection stage of the cycle, where the part is ready to be molded.

FIGS. 1 and 11 show the ejector half 41 of the mold 45 in the initial stage or clamped position of the injection mold of the cycle. In the clamped position the injection mold 45 is ready to be injected with melted plastic material from the press for forming the part 22.

Figure 3:
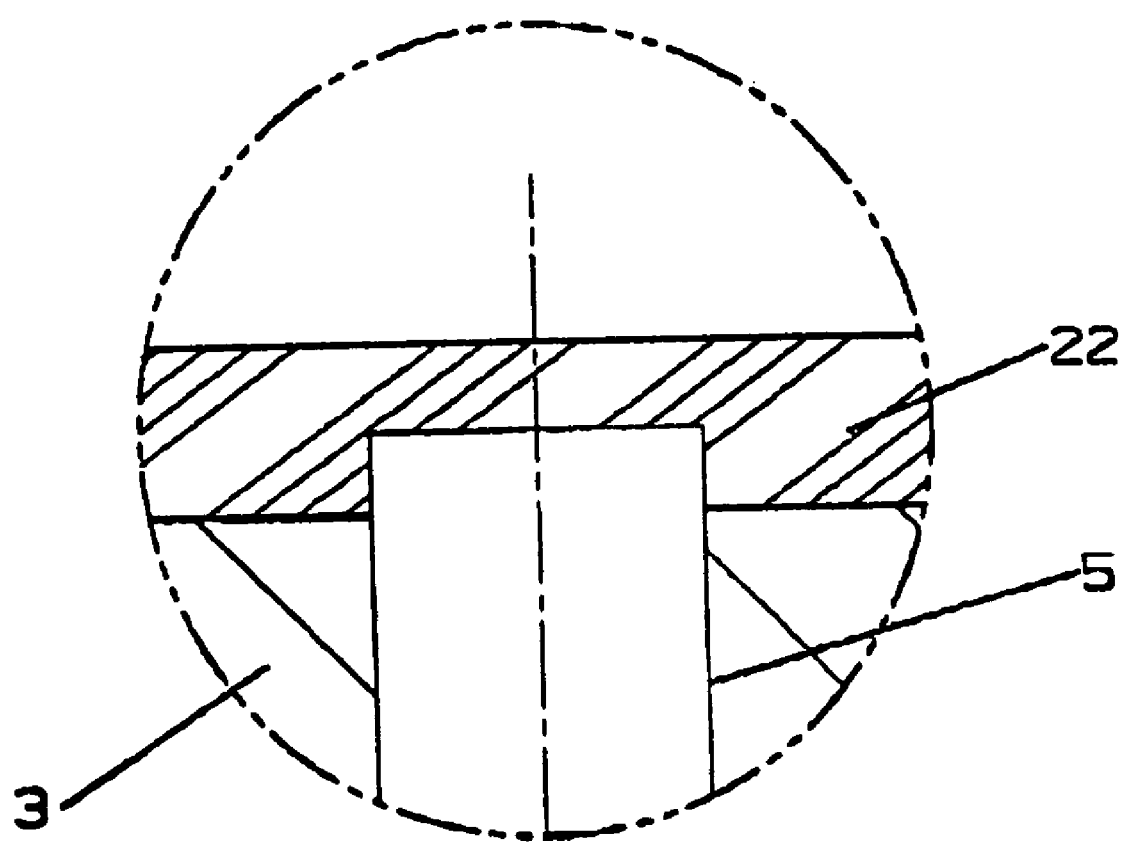
FIG. 3 is an enlarged sectional view according to FIG. 1 of a portion of a decelerated ejector pin embedded in the molded part.

FIG. 2 shows that the injection mold 45 is still in the clamped position and the plastic material has been injected into the cavity 17 to form the part 22. The clamped position is maintained until the part has cooled sufficiently to be ejected. It is shown in the enlarged FIG. 3, that after the injection of plastic material is completed, the decelerated pin 5 is embedded in the part 22. Also, it is shown in FIG. 2 that the plastic surrounds the cavity detail 12 of the lifter to create the desired part feature.

Figure 4:
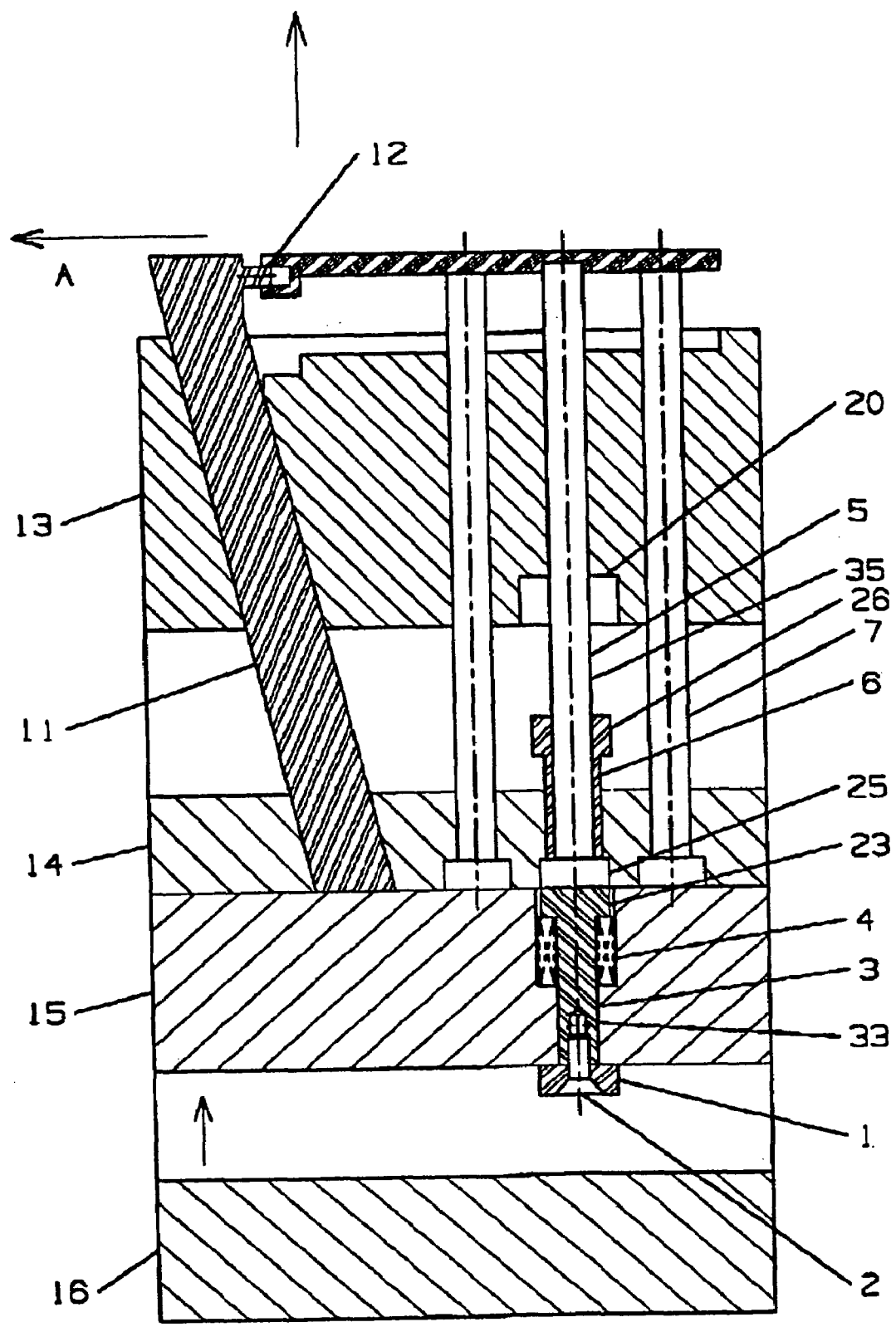
FIG. 4 is a partial-sectional view of the ejector half of the mold according to FIG. 1 during a first stage of ejection, where the decelerated ejector pin de-molds a molded part from a lifter cavity detail.

FIG. 4 shows a first stage of ejection, initiated by the press, where the lifter and the ejectors begin to move out of the core plate 13. The decelerated ejector pin 5 remains embedded in the part 22, to hold the part on the decelerated ejector pin 5, which allows the lifter cavity detail 12 to move along the lifter de-molding axis A, while de-molding from the molded part 22.

Figure 6:
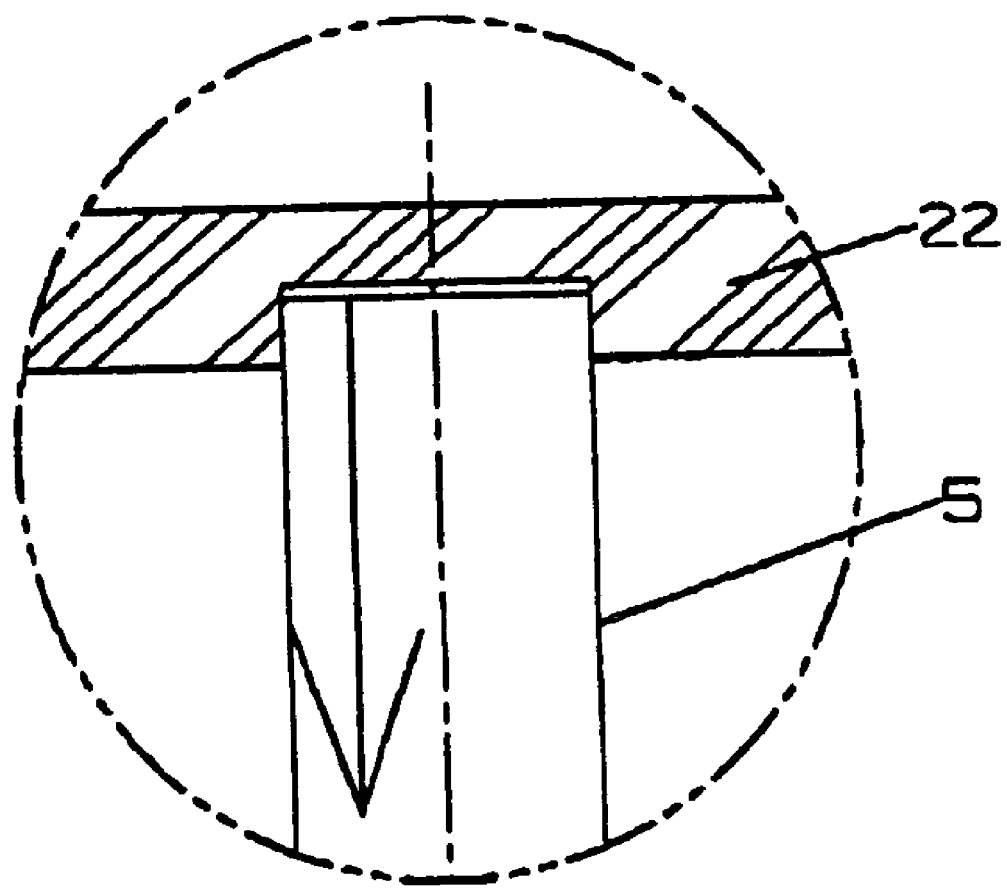
FIG. 6 is an enlarged sectional view according to FIG. 1 of an embedded portion of the decelerated ejector pin after the deceleration of the decelerated pin has been initiated.

FIG. 5 shows a second stage of ejection where the lifter is completely de-molded from the part 22 and the deceleration of the decelerated ejector pin 5 is initiated. The sleeve 6 makes contact with the core plate 13, which pushes down on the head 25 of the decelerated ejector pin 5. The decelerated ejector pin 5 in turn presses down on the stop pin 3, which compresses the spring 4. The ejector pins 7 continue to move the part off of the decelerated ejector pin 5, which is decelerated due to the compression of the spring 4. FIG. 6 shows an enlarged view of the initiation of the deceleration of the decelerated ejector pin 5.

Figure 7:
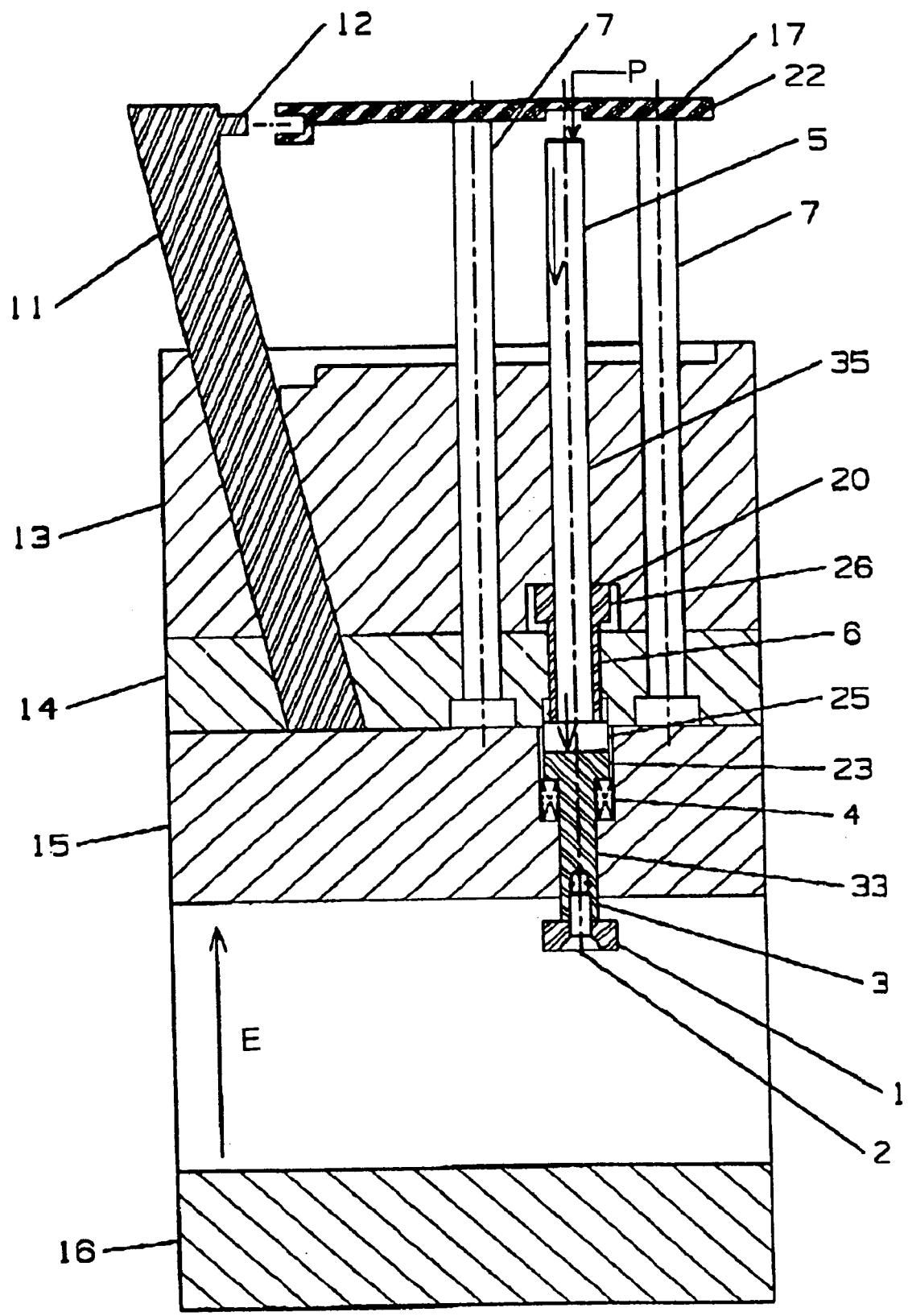
FIG. 7 is a partial-sectional view of the ejector half of the mold according to FIG. 1 during a third stage of ejection, where the molded part is completely de-molded from the decelerated ejector pin.

FIG. 7 shows a third stage of ejection, where the ejectors 7 have continued to move and decelerated ejector pin 5 is completely de-molded from the molded part 22. The spring 4 has been further compressed and the amount of deceleration P of the decelerated ejector pin can be seen. FIG. 8 shows an enlarged view of the stop pin 3 compressing the spring 4 during the third stage of ejection.

Figure 9:
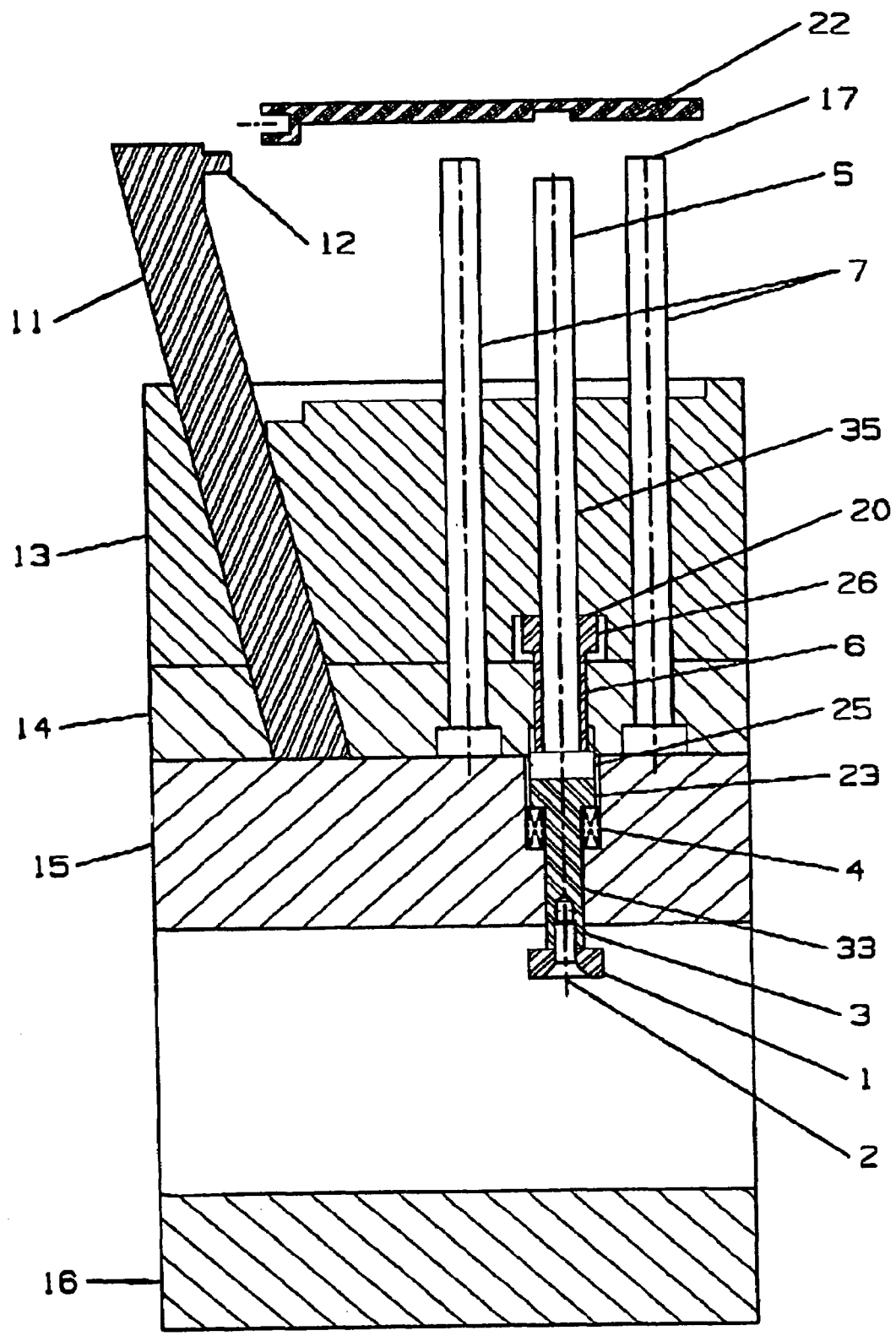
FIG. 9 is a partial-sectional view of the ejector half of the mold according to FIG. 1 where the molded part is completely clear of the injection mold and the ejection system is ready to return to the clamped state to complete the cycle.

FIG. 9 shows that the momentum of the ejectors 7 has propelled the molded part 22 off of the ejectors 7 and the injection mold is ready to begin a new molding cycle.

FIG. 10 also shows an enlarged view of the decelerated ejector pin system 18 returned back to its original state ready for the injection stage of the process.

I claim:

1. In an ejector half of an injection mold, for molding a molded part, the ejector half having at least one lifter, a core plate, a pin plate an ejector bar, a base plate, and at least one ejector pin, a decelerated ejector pin system, comprising:
    at least one further ejector pin to be moved and decelerated through the core plate, said further elector pin having a head and a shaft;
    at least one sleeve being actuated by the core plate for decelerating said further ejector pin, said sleeve having a head, said sleeve being located on said shaft of said further ejector pin and a counter bore formed in the core plate actuates said sleeve by engaging said sleeve head;
    a spring disposed in the ejector bar;
    at least one stop pin supporting said further ejector pin and compressing said spring, said stop pin having a head and a shaft, said shaft of said stop pin being disposed inside said spring, and said head of said further ejector pin resting on said head of said stop pin for compressing said spring; and
    a cap attached to said stop pin for pre-stressing said spring.

2. The decelerated ejector pin system according to claim 1, wherein a screw attaches said cap to said stop pin.

3. The decelerated ejector pin system according to claim 1, wherein said further ejector pin is longer than the at least one ejector pin.

4. In an injection mold having an ejector half for molding a molded part in an injection molding machine with ejector drive system, the ejector half, comprising:
    a core plate having a cavity and a counter bore formed therein;
    a retainer plate disposed adjacent said core plate;
    an ejector bar disposed adjacent said retainer plate;

a base plate disposed adjacent said ejector bar;

at least one ejection pin mounted in said retainer plate and being moveable through said core plate;

at least one lifter having a cavity detail forming a feature in the molded part, said lifter being moveable through said core plate;

at least one further ejector pin to be moved and decelerated through said core plate and projecting into said cavity, said further ejector pin being longer than said at least one elector pin, and said further ejector pin having a head and a shaft;

said ejector pin and said further elector pin being moveable through said core plate on an ejection axis;

said lifter being moveable through said core plate on an axis at an angle with respect to said ejection axis;

at least one sleeve being actuated by said core plate for decelerating said further ejector pin, said sleeve having a head, said sleeve being located on said shaft of said further ejector pin and said counter bore actuating said sleeve by engaging said sleeve head;

a spring disposed in said ejector bar;

at least one stop pin supporting said further ejector pin and said stop pin being located inside said spring and compressing said spring, said stop pin having a head and a shaft, said shaft of said stop pin being disposed inside said spring, said head of said further ejector pin resting on said head of said stop pin for compressing said spring; and a cap attached to said stop pin for pre-stressing said spring.

5. The ejector half according to claim 4, wherein a screw attaches said cap to said stop pin.

6. A method of producing molded parts in an injection molding press during a cycle, the method comprising:

providing an injection mold with an ejector half according to claim 4;

clamping the injection mold;

injecting material into the at least one cavity;

timing out a cooling stage of the cycle;

unclamping and opening the injection mold;

moving the ejector bar for ejecting the molded part from the injection mold;

decelerating the further ejector pin after the lifter cavity detail is demolded from the molded part; and de-molding the molded part from the further ejector pin.

7. The method of producing molded parts according to claim 6, wherein the material injected into the at east one cavity forms a part around the lifter cavity detail and the at least one further ejector pin.

8. The method of producing molded parts according to claim 6, wherein a continuing movement of the ejector pins completely de-molds the at least one further ejector pin from the molded part and allows the molded part to be dropped clear of the injection mold.

* * * * *